Figure 1:
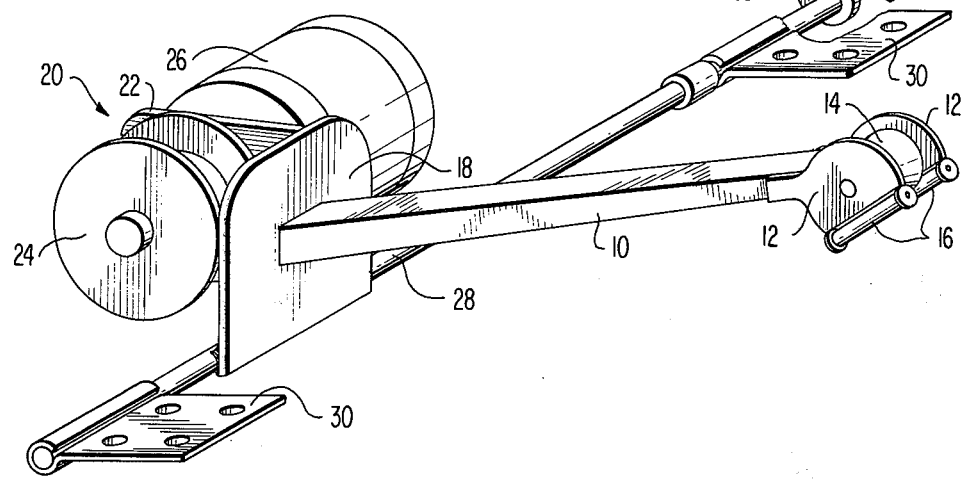

United States Patent [19]

Andersen

[11] 3,942,655
[45] Mar. 9, 1976

[54] LOBSTER TRAP DAVIT
[75] Inventor: Halvor L. Andersen, Gorham, Maine
[73] Assignee: The Harris Company, Portland, Maine
[22] Filed: Apr. 2, 1974
[21] Appl. No.: 457,393

[52] U.S. Cl.................. 214/15 R; 9/39; 214/523
[51] Int. Cl.² ........................................ B63B 27/20
[58] Field of Search................ 214/15 R, 523; 9/39

[56] References Cited
UNITED STATES PATENTS
1,194,334 8/1916 Fuller........................................ 9/39
2,865,518 12/1958 Matheisel........................... 214/15 R
3,465,901 9/1969 Grabowski......................... 214/15 R
FOREIGN PATENTS OR APPLICATIONS
25,058 11/1903 United Kingdom....................... 9/39

Primary Examiner—Robert J. Spar
Assistant Examiner—George F. Abraham

[57] ABSTRACT

A davit which is particularly useful in hoisting lobster traps from water onto a gunwale of a lobster boat, comprises a hoist arm; an essentially perpendicularly extending member in a substantially horizontal direction at one end of the hoist arm wherein the perpendicularly extending member is adapted to rotate on an axis essentially perpendicular to the hoist arm whereby rotation of the perpendicularly extending member causes the hoist arm to pivot; and a power means remote but in communication with the hoist arm by means of the perpendicularly extending member. Upon actuation, the power means is adapted to cause the perpendicularly extending member to rotate and the hoist arm to pivot. The end of the hoist arm opposing the perpendicularlly extending member is adapted to receive a hoist line. In a lobster trap hauling operation, the pivoting of the davit may assist in hauling a lobster trap onto the gunwale of the lobster fishing boat.

5 Claims, 2 Drawing Figures

U.S. Patent   March 9, 1976   3,942,655

LOBSTER TRAP DAVIT

This invention pertains to a davit which comprises a hoist arm which may be pivoted in a vertical plane without sacrifice to accessibility to and around the hoist arm and hoist line. The davit of this invention is particularly advantageous for hauling lobster traps and the like from water onto a gunwale of a boat in that not only does the lobster fisherman not have to reach over the side of the boat to haul a lobster trap onto the gunwale of the boat, but also he has relatively unfettered access to the lobster trap when it is resting on the gunwale of the boat.

Prior to this invention, a lobster fisherman either had to undertake the risk and physical stress and strain of manually lifing a lobster trap from the water onto the gunwale of a boat or he used a davit which employed overhead cables or the like to pivot the hoist arm to draw the lobster trap onto the gunwale of the boat or other suitable structure of the boat or davit. However, the overhead cables and the like which have been employed to pivot the davit interfered with the lobster fisherman's access to the lobster trap and required significant space on the boat for the necessary rigging.

By this invention, a davit is provided which is particularly advantageous especially in situations where compactness of and accessibility around the davit are essential, for instance, in hauling lobster traps from the water onto a gunwale of a boat. The davit comprises a hoist arm having a base end and a tip end. An essentially perpendicularly extending member to the hoist arm extends in an essentially horizontal direction from base end of the hoist arm. The perpendicularly extending member is rotably mounted on a stationary member such that it is able to rotate around an axis essentially perpendicular to the hoist arm. The movement of perpendicularly extending member around said axis causes the hoist arm to pivot in an essentially vertical plane.

When employed to hoist traps and in the operation wherein the lobster trap is hauled to the surface of the water the davit hoist arm can be positioned with the base end to the inside of the gunwale such that the hoist arm extends outwardly across the gunwale with the tip end extending over the water. The hoist arm may be essentially horizontal. When the lobster trap reaches a desired point adjacent the tip end of the hoist arm, the hoist arm is pivoted on the axis of the perpendicularly extending member in order to haul the lobster trap onto the gunwale of a boat. When the hoist arm is being pivoted, the hoist line may be held stationary with respect to the hoist arm or drawn in or let out as necessary. It is easily seen that the davit of this invention has advantageous applications in hoisting loads other than lobster traps and is capable of advantageous use as a hoist on supports other than boats.

The hoist arm may have attached thereto at the base end suitable means for drawing the hoist line, for instance, a winch, power warping block or the like. It is desirable, where space is limited and essentially unrestricted access around the davit is required, such as on a lobster trap fishing boat, that the drawing means should be compact. Desirably, the drawing means is positioned on the hoist arm such that after the hoist arm has been pivoted to haul, for instance, a lobster trap onto the gunwale of a boat, the drawing means is positioned under the hoist arm or even under the gunwale of the boat, and hence, does not restrict access to the lobster trap. The tip end of the hoist arm may be provided with a pulley for the hoist line and, if desired, guide means, e.g., rollers, to direct the hoist line onto the pulley and maintain it thereon.

The pivoting of the hoist arm is effected by rotation of the perpendicularly extending means around its axis. The perpendicularly extending means may serve as a drive means which can transmit power from a remote power means to the hoist arm to pivot the hoist means. The perpendicularly extending member thus permits the power means to be sufficiently distant from the hoist arm to allow relatively free access around the davit. The power means for rotating the perpendicularly extending member may comprise an attached electric motor, an electric motor in communication with the perpendicularly extending member by gears, pulleys and belt, chain and sprockets, or the like, levers which can be manually operated, etc. A preferred power means employs an actuating means, e.g., a hydraulic or pneumatic piston and cylinder arrangement, wherein the piston is in communication with a cam which is fixedly attached to the perpendicularly extending member whereby movement of the piston moves the cam to achieve rotation of the perpendicularly extending member.

Figure 2:
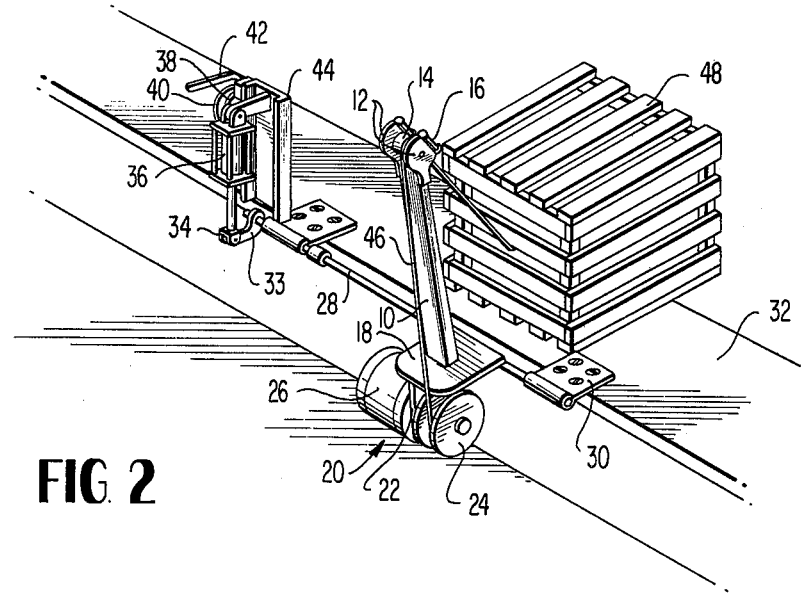

The invention is further described in a preferred embodiment by reference to the drawings in which FIG. 1 is a diagrammatic representation of a davit in accordance with this invention; and FIG. 2 is a diagrammatic representation of the davit of FIG. 1 employed on a boat to haul lobster traps, wherein the davit and lobster trap are in the position achieved when the lobster trap has been hauled onto the gunwale of the boat.

With reference to the drawings, the davit comprises hoist arm 10 which has flanges 12 at the tip end. Flanges 12 are in a vertical plane and serve to receive therebetween pulley 14. The axis of rotation of pulley 14 is depicted as horizontal and is adapted to receive a hoist line. Rollers 16 are provided on the lower ends of flanges 12 such that a hoist line, when it is drawn across the tip of the base end of hoist arm 10, will be directed towards and maintained on pulley 14.

The base end of arm 10 is depicted as plate 18 which is shown in a plane essentially perpendicular to the extension of the hoist arm. Plate 18 serves as a support base for the drawing means 20. Drawing means 20 is comprised of mounting member 22 which extends perpendicularly from plate 18, warping pulley 24, and warping block motor which is enclosed in casing 26. Mounting member 22 may be adapted to serve as a counterweight to the hoist arm, especially in instances when the hoist arm is long and heavy.

The base end of hoist arm 10, that is, plate 18, has extending therefrom at its lower edge, perpendicularly extending member 28, which is depicted as a rod. Rod 28 is pivotably attached to brackets 30 which are adapted to be fastened to the underneath side of gunwale 32. A sufficient offset space is provided between the axis of rod 28 and hoist arm 10 such that hoist arm 10 may assume an essentially horizontal orientation over the gunwale, if desired. The hoist arm is sufficiently long that its tip end extends over the side of the boat.

The actuating means for rotating rod 28 and hence pivoting hoist arm 10 comprises cam 33 which is fixedly attached and perpendicularly extends from rod 28. Cam 33 is attached by means of drive mechanism 34 to piston and cylinder 36. Drive mechanism 34 is moveably attached to cam 33 such that movement of the piston in piston and cylinder 36 causes rotation of rod 28 around its axis and thus pivots hoist arm 10. Movement of the piston in piston and cylinder 36 is effected by passage of fluid to piston and cylinder 36 via lines 38 or 40. A valve mechanism (not shown) is controlled by lever 42 and is employed to direct the fluid to either of lines 38 and 40 to obtain the desired direction of piston movement. Mounting member 44 is affixed to the mounting bracket 30 and supports piston and cylinder 36.

In operation, hoist arm extends essentially horizontally over the gunwale of the boat such that pulley 14 is directly over the water. A lobster trap line is located by the buoy attached thereto and is drawn across pulley 14, and the line is placed in warping pulley 24. The warping block motor is started, and lobster trap line 46 drawn into the boat and lobster trap 48 is raised. When the lobster trap reaches a predetermined distance from the tip of hoist arm 10, the motor is stopped. The distance between the lobster trap and hoist arm at this point will depend on the size of the lobster trap, the length of the hoist arm, the width of the gunwale, and the expected degree of pivot of the hoist arm. The distance should be sufficient to permit the lobster trap to rest on the gunwale of the boat when the hoist arm is pivoted.

Lever 42 is then positioned to actuate the piston and cylinder, thereby extending drive mechanism 34 from the cylinder and causing rod 28 to rotate by movement of cam 33. The rotation of rod 28 causes hoist arm 10 to pivot in a vertical plane towards the inside of the boat, thus hoisting lobster trap 48 on to gunwale 32 of the boat. The movement of rod 28 is conveniently terminated when hoist arm 10 has brought lobster trap 48 to a point where it rests on the gunwale of the boat. The drawing means is also rotated such that it is under hoist arm 10 and thus will not hinder access to the lobster trap.

The lobster fisherman can have relatively free access to the lobster trap since the power means is remote from the hoist arm and no cables are required to pivot the hoist arm. The apparatus of this invention does not require excessive area when in operation, and hence can be adapted for use in locations where space is limited.

It is claimed:
1. A pivotable davit for hauling a load from water onto a gunwale of a boat comprising
   a. a hoist arm having a tip end and a base end, said tip end being adapted to receive a hoist line;
   b. a perpendicularly extending member which is fixedly attached to the hoist arm at the base end and extends essentially perpendicular to the extension of the hoist arm, said perpendicularly extending member being pivotably attached to the gunwale of the boat such that the perpendicularly extending member is able to rotate around an axis perpendicular to the hoist arm;
   c. a cam fixedly attached to the perpendicularly extending member sufficiently distant from the hoist arm to allow relatively free access around the hoist arm between the hoist arm and cam;
   d. an actuating means movably attached to the cam such that movement of the actuating means rotates the perpendicularly extending member around its axis and pivots the hoist arm, thereby adapting the hoist arm to hoist the load onto the gunwale of the boat by the pivoting motion; and
   e. a drawing means attached to the base end of the hoist arm and extending rearwardly therefrom such that the drawing means is under the hoist arm when the load has been hoisted onto the gunwale, said drawing means being adapted to receive and draw the hoist line across the tip end of the hoist arm.

2. The pivotable davit of claim 1 wherein the actuating means is a piston and cylinder.

3. The pivotable davit of claim 1 wherein the hoist arm extends horizontally across the gunwale with the tip end extending over the water and pivots to hoist the load onto the gunwale.

4. The pivotable davit of claim 1 wherein the hoist arm extends horizontally across the gunwale with the tip end extending over the water and pivots to hoist the load onto the gunwale.

5. The pivotable davit of claim 1 wherein the hoist arm pivots in an essentially vertical plane.

* * * * *